United States Patent [19]
Crisler et al.

[11] Patent Number: 5,179,559
[45] Date of Patent: Jan. 12, 1993

[54] HANDOFF METHOD FOR A CELLULAR SYSTEM

[75] Inventors: Kenneth J. Crisler, Wheaton; Bradley M. Hiben, Glen Ellyn, both of Ill.; Anthony P. van den Heuvel, Parkland, Fla.

[73] Assignee: Motorola, Inc., Schaumburg, Ill.

[21] Appl. No.: 560,910

[22] Filed: Jul. 27, 1990

[51] Int. Cl.$^5$ .............................. H04Q 7/04; H04J 3/16
[52] U.S. Cl. .................... 370/95.1; 455/33.1; 379/60
[58] Field of Search ............... 370/95.1, 17; 379/60; 455/33

[56] References Cited

U.S. PATENT DOCUMENTS

| | | | |
|---|---|---|---|
| 3,693,088 | 9/1972 | Rustako, Jr. et al. | 325/56 |
| 3,898,390 | 8/1975 | Wells et al. | 179/41 |
| 3,906,166 | 9/1975 | Cooper et al. | 179/41 |
| 4,229,620 | 10/1980 | Schaible | 455/31 |
| 4,556,760 | 12/1985 | Goldman | 179/2 |
| 4,696,027 | 9/1987 | Bonta | 379/60 |
| 4,926,421 | 5/1990 | Kawano et al. | 379/60 |
| 4,955,082 | 9/1990 | Hattori et al. | 379/60 |
| 4,968,966 | 11/1990 | Jasinski et al. | 379/60 |
| 4,996,715 | 2/1991 | Marui et al. | 379/60 |

Primary Examiner—Douglas W. Olms
Assistant Examiner—Min Jung
Attorney, Agent, or Firm—Robert S. Babayi

[57] ABSTRACT

A TDM cellular communication (100) system includes a plurality of repeaters (102) each providing communication coverage for a cell site. A plurality of communication units communicate with the repeaters. The communication units are handed off from one cell site to another by measuring the range of the communication units from the repeaters. If the range exceeds a predetermined range the received signal quality of the adjacent cell site repeaters are measured. An available cell site which provides the best received signal quality is selected by the communication unit for hand off.

6 Claims, 5 Drawing Sheets

HANDOFF METHOD FOR A CELLULAR SYSTEM

TECHNICAL FIELD

This invention relates generally to the field of Cellular communications, and more specifically to a hand off method for Cellular Systems.

BACKGROUND

In a conventional cellular type communication system, a communication unit such as a portable or mobile radio can move from one geographic cell site location to another. In order to maintain the communications link when the communication unit travels outside of the coverage area of the currently registerd cell site, the communication system must hand off the call to a new cell site. Otherwise, calls may be terminated prematurely.

Conventional cellular systems typically have a central controller that instructs the communication unit as to which cell site it should move to in order to access another cell site for reliable communication. The central controller determines which cell site has the best communication quality with the communication unit by using a voting arrangement where different cell site receivers report on the strength or quality of signal received from the communication unit. In these cellular systems, the central controller monitors each call from a communication unit at its assigned site as well as at cell sites in the adjacent cells. The measured signal quality (that would indicate whether a hand off would be necessary for continued communications) are relayed to a switching center by way of telephone lines to each cell site. When the signal characteristics indicate that a hand off is required, a suitable new cell site is chosen, and a hand off message is sent to the communication unit. This type of hand off is completely managed by the fixed network equipment, and does not require any input from the individual communication units. While such an approach provides for an effective hand-off, it requires a substantially complex and expensive infrastructure and fails to consider the signal quality at the mobile unit.

In another approach where the communication unit it self is involved in the hand off process, the communication unit determines when and which cell site to hand off to by perodically scanning the adjacent cell sites. The scanning process may briefly interrupt the audio signal present in a communication unit call. However in this approach, if the scanning is done too often, serious degradation of the audio quality would occur. On the other hand, if the scanning is done too infrequently, the communication unit may lose a call due to a rapid degradation in the signal quality.

SUMMARY OF THE INVENTION

Accordingly, it is the objective of the present invention to provide an effective hand off method which overcomes the disadvantages of the prior art.

Briefly, according to the invention, a cellular communication system is divided into a plurality of cell sites. Each cell site includes a repeater unit for communicating with at least one communication unit. The repeater unit determines the range of the communication unit and transmits an interrupt signal if the range exceeds a predetermined range for quality communication. The communication unit upon reception of the interrupt signal commences scanning and measuring received signal quality of adjacent cell sites. The communication unit selects an available cell site which provides the best signal quality and attempts to hand off to that cell site.

DETAILED DESCRIPTION OF THE PREFERRED EMBODIMENT

Figure 1:
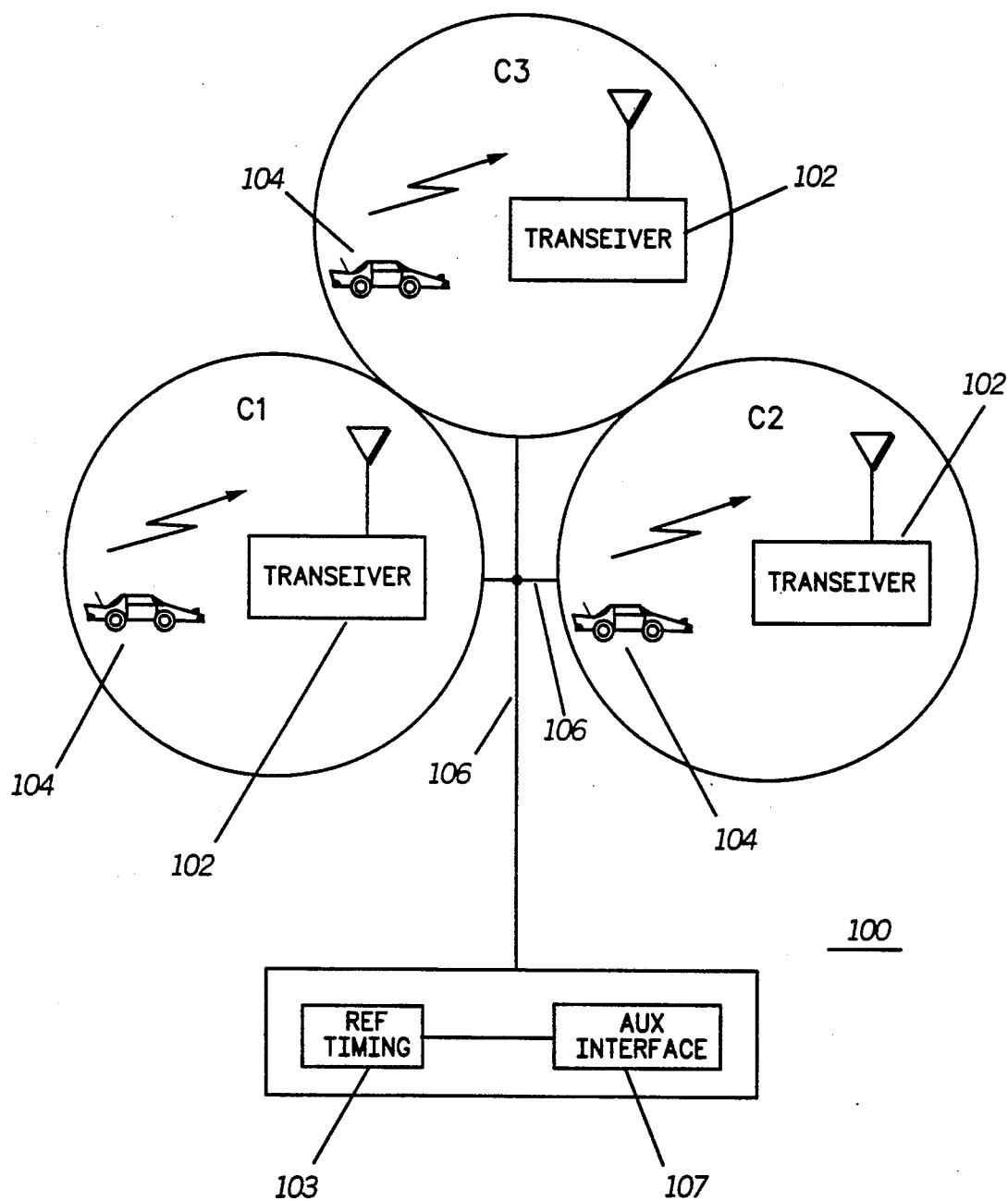
FIG. 1 illustrates a block diagram of the TDM communication system which utilizes a hand off method according to the present invention.

Referring to FIG. 1, a time division multiplexed (TDM) communication system incorporating the principles of the present invention can be seen as generally depicted by the numeral 100. The communication system 100 may be considered as a wide area coverage communication system which provides communication capability between a plurality of communication units 104. (As used herein, "communication unit" is intended to refer to any of a variety of radio platforms, including but not limited to mobile radios, portable radios, and fixed location radios, including both one-way and two-way devices). The coverage area of the system 100 is divided into a plurality of cell sites C1, C2, and C3 within which the communication units 104 may travel.

The system 100 includes generally a central controller 101, that controls the allocation of communication time frames and time slots to promote organized communication between the communication units 104.

In a TDM communication system a frequency channel is subdivided into transmit and receive frames and time slots. Upon request, each communication unit is assigned a time slot at which time it may receive or transmit information. Depending on application, the receive and transmit time slots include a control time slot in which the control information are embedded. As is well known, the control information may comprise synchronization bits, identification bits, etc.

The central controller 101 connects via known interconnections with a plurality of repeaters 102; there being one repeater 102 for each supported frequency (or frequency pair, depending upon the application). Located in each cell sites C1-C3 is a repeater 102, wherein the communication units 104 are handed off from one repeater 102 to another as they travel through the cell sites in the coverage area. The central controller 101, controls the operation of the repeaters 102 and provides the control information. Each repeater 102 may include a microprocessor and associated digital circuitry, in which case the controlling actions of the central controller 101 may take the form of data packets transferred over an interconnection network 106. The central controller 101 also includes a reference timing generator 103. The timing generator 103, which may include a high stability reference oscillator, provides various clock signals, including but not limited to a TDM frame clock, slot clock, and data symbol clock to maintain time synchronization throughout the system. The central controller 101 may also include one or more auxiliary interface units 107 which provide means to interconnect the system 100 with non-radio frequency (RF) communication units, such as conventional telephone lines and dispatch consoles.

Figure 2:
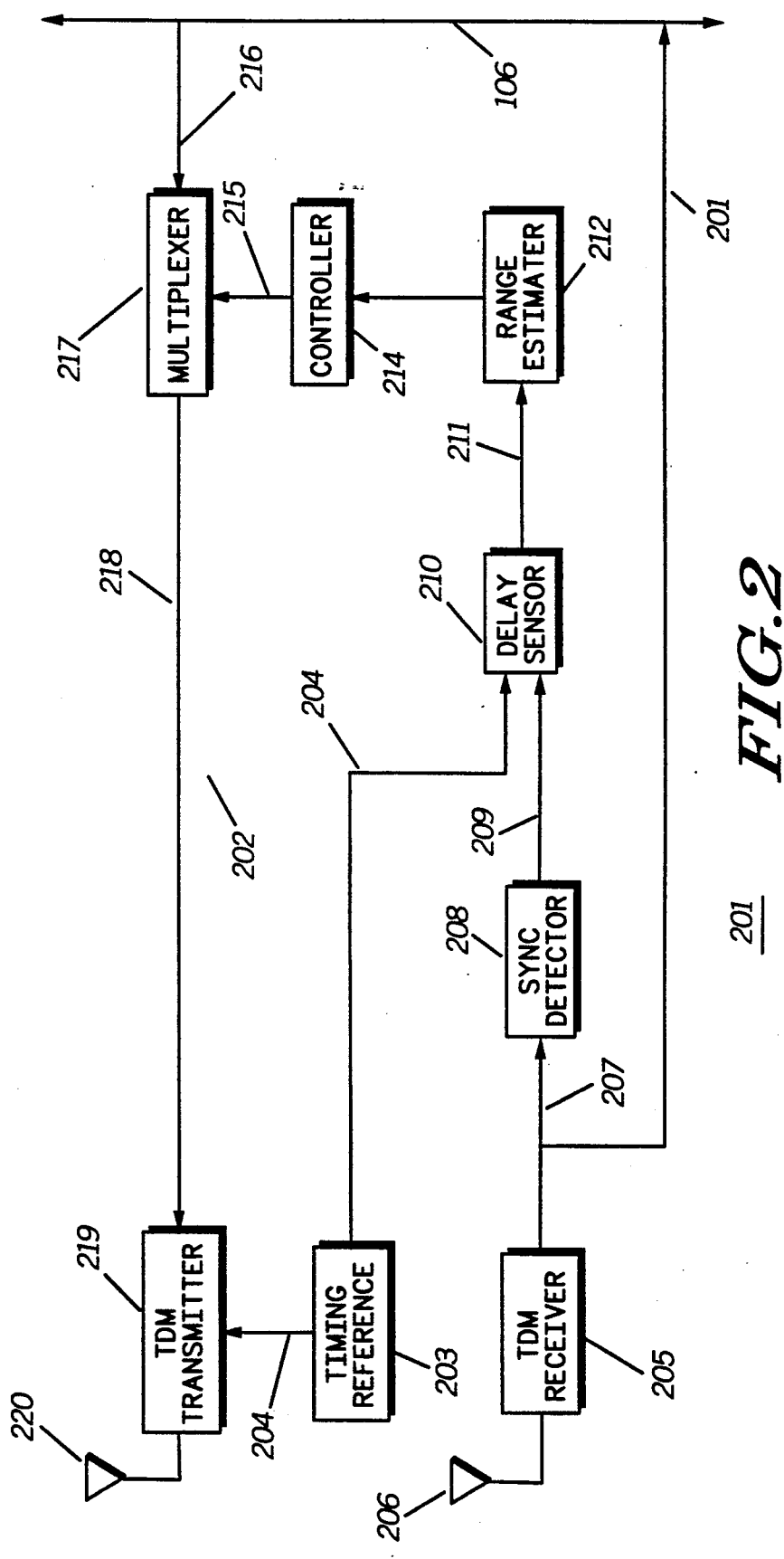
FIG. 2 illustrates block diagram of a repeater utilized in the TDM communication system of FIG. 1.

Referring to FIG. 2, the repeater 102 is shown to include a receive section 201, a transmit section 202. A timing reference generator 203 which is synchronized with the reference timing generator 103 of the central controller 101 provides a synchronization signal 204 so as to maintain time synchronization among other repeaters 102, the communications units 104 and the central controller 101. The receiver section 201 includes a well known TDM receiver 205 that receives signals via an appropriate antenna structure 206 and that provides at its output a RX data 207. The TDM receiver operates in a known manner to recover any voice or data information (such as, for instance, control slot and information) included in the received signal, thus providing the RX data 207. The recovered voice signal included in the RX data may be a processed version of the original audio signal (for example, voice processed via Sub-Band Coding or Linear Predictive Coding). The RX data 207 is applied to the network interface 106 to be transmitted to the central controller 101 or other repeaters 102. The transmitter section 202 receives a TX data 216 from the network interface 106. The TX data 216 may comprise received RX data signal from the repeater's receiver section 201 and/or control channel information from the central controller 101. As will be described later, additional control commands and data provided by a repeater controller 214 may also be inserted into the TX data by a multiplexer 217 to provide a TX signal 218. The TX signal is applied to a well known TDM transmitter 219 that properly processes the signal to provide an RF signal that may be appropriately radiated from an antenna device 220. The transmitter may include a DSP to reformat the voice signal as appropriate for various receiving communication units (such as, via Sub-Band Coding or Linear Predictive Coding). The transmission of the signals by the TDM transmitter is synchronized via the main synchronization signal 204 provided by the timing reference generator 203. So configured, the repeater 102 receives RF signals and properly processes them to recover both voice and data information that may be present in the communication and retransmits them to either the central controller 101 or the communication unit 104. IT may be appreciated that the repeater 102 may be replaced by a transceiver, wherein the received information from a communication unit is not retransmitted to other communication units 104. Rather, the transceiver retransmits voice and information data received form the central controller 101. These, voice and data informations may for example be initiated via a telephone exchange coupled to the central controller 101. Accordingly, the repeater 102 constitutes a transceiver for communication with at least one communication unit 104.

The RX data 207 is also applied to a synchronization detector 208 to retrieve a portion which includes a predetermined synchronization bit pattern. The synchronization detector 208 retrieves the synchronization bit pattern by decoding the RX data 207 until received synchronization signal 209 is found. The synchronization signal 209 and the main synchronization signal 204 (from the timing reference generator) are applied to a delay sensor 210. The delay sensor operates in a known manner to provide the time delay between the beginning of the two synchronization signals 204 and 209. In this manner, the main synchronization signal 209 provides the reference time from which the time delay is measured. This time delay corresponds to the sum of the propagation delay of the signal transmitted by the repeater, the propagation delay of the signal transmitted by the communication unit 104, and any time delay introduced at the communication unit between reception of the repeater's transmitted signal and transmission of the communication unit's transmitted signal. As will be seen later, any such time delay will be constant and known at the repeater. The two propagation delays are nominally the same. Thus the propagation delay of signal transmitted by the communication unit 104 can be deduced and may be converted to an estimation of the range in the range estimator 212. One of ordinary skill in the art appreciates that the measured propagation delay 211 may be multiplied by the velocity of radio frequency waves (i.e., speed of light) to correspond to a range from which the received signal was transmitted. The range estimation 213 is applied to the repeater controller 214 which utilizes it for further processing. One may appreciate that the range estimation may entirely be achieved in the repeater controller 214 by directly applying the RX signal 207 and the main synchronization signal 209 to the repeater controller.

Figure 3:
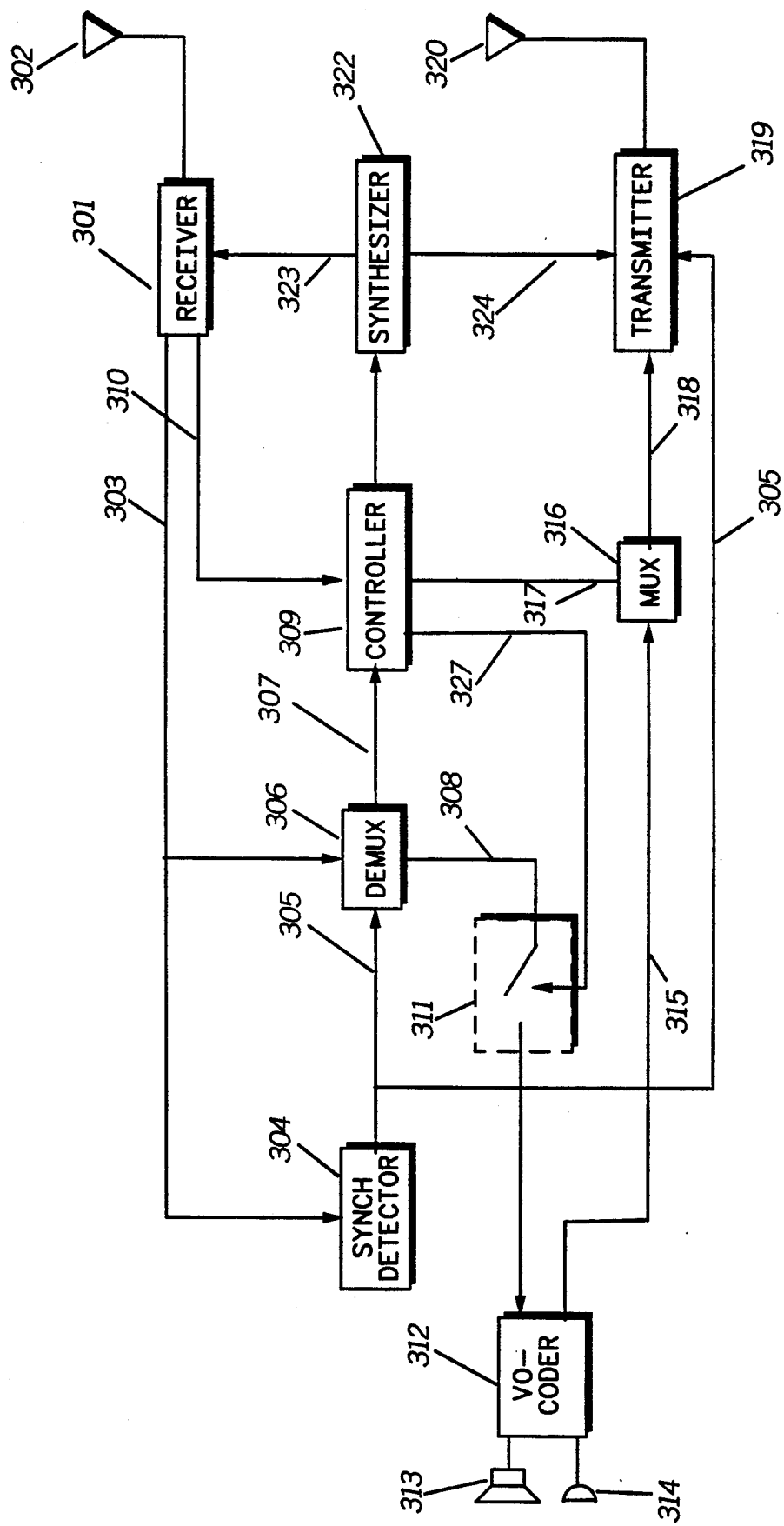
FIG. 3 illustrates block diagram of a communication unit according to the present invention.

Referring to FIG. 3, a communication unit is shown to include a TDM receiver 301 that couples to an appropriate antenna 302 to receive RF signals. The received signal 303 is applied to a synchronization detector 304 which provides a synchronization signal 305. The synchronization signal 305 provides the information required to establish frame and bit synchronization. The synchronization signal 305 is applied to a demultiplexer 306 so as to retrieve control data 307 and the RX data 308 embedded within the RX signal 303. The control data 307 is applied to a controller 309. The receiver 301 also provides a signal quality indicator 310 which may comprise the received signal strength or any other signal quality indicators, such as bit error rate and/or signal to noise ratio (SNR), to the controller 309. A switch 311 under the control of the controller 309 applies the RX data 308 to a voice coder (vo-coder) 312. The controller 309 controls the switch 311 by applying an interrupt signal 327 to open or close the switch 311. The vo-coder 312 provides the required coding/decoding function used in this embodiment to properly encode (or decode) the audio information in a particular form. In the preferred embodiment of the present invention, multi-level, digital sub-band coding comprises the preferred encode/decode format. The vo-coder 312 routes decoded signals to an appropriate speaker 313 to be rendered audible. Audio signals to be transmitted are routed from a microphone 314 to the vo-coder 312 for processing. The processed audio information are in the form of digital information TX data 315. The TX data 315 is applied to a multiplexer 316 which appropriately adds other control information 317 to the TX data and provides the TX signal 318. The TX signal 318 is applied to a well known TDM transmitter 319 which is synchronized by the synchronization signal 305. The TDM transmitter uses the synchronization signal 305, which is derived from the RX signal 303, to establish a constant timing relationship between the RX signal 303 and the TX signal 318. This timing relationship is specific as a part of a particular communication protocol and thus would be known to both the communication unit 104 and the repeater 102. Ultimately, the properly coded and slot and frame synchronized information signal are transmitted via an antenna 320. It may be appreciated that the antennas 302 and 320 may be replaced by a single antenna and an antenna switch which is controlled by the controller 309 to selectively couple the TDM transmitter 319 and the TDM receiver 301 to the single antenna. Alternately, a duplexer could be used in place of the antenna switch and or the antennas as is known in the art.

The controller 309 is the heart of the communication device and operates to control the many circuits comprising the communication device 104. The controller provides frequency data 321 for programming a synthesizer 322. The synthesizer produces the receiver and transmitter frequency local oscillator signals 323 and 324. Accordingly, the TDM receiver 301 and the TDM transmitter 324 may be used to receive or transmit on a particular frequency under the control of the controller 309. The controller 309 may comprise any well known microcontroller, such as MC68HC11 TM manufactured by Motorola Inc. Alternatively, the controller may be a part of a digital signal processor, such as DSP 56000 manufactured by Motorola, which also embodies the vo-coder 312.

According to the present invention, the communication unit is handed off from one cell site to another cell site based on both the range of the communication unit and the quality of signal received from the repeaters 102 of the adjacent cell sites.

Figure 4:
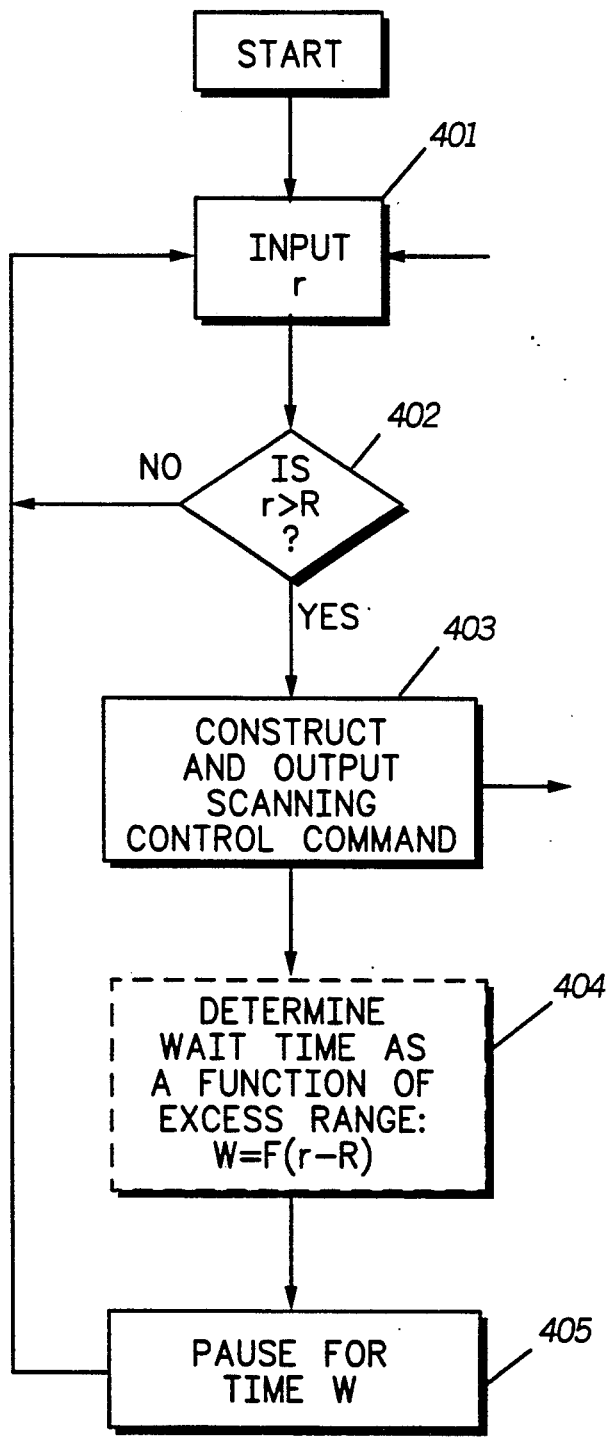
FIG. 4 is the flow chart of the operational steps of the repeater of FIG. 2.

Referring to FIG. 4, flow chart of the operation of the repeater 102 and the steps taken by the repeater controller 214 to achieve the intended purpose of the invention is shown. The controller 214 receives the estimated range 213 from the range estimator 212, block 401. The estimated range represented by r is compared to a predetermined range R, block 402. The predetermined range R corresponds to a threshold range for quality communications. It is found that when the communication unit 104 is positioned within half of the radius of a cell sites, it communicates effectively with the corresponding repeater 102. However, when the communication unit 104 travels beyond the half radius distance of the cell sites C1-C3, the communication quality is rapidly degraded. Therefore, in the preferred embodiment of the invention the predetermined range R is equal to one half of the cell site radius. If the estimated range is less than the predetermined range R, no action is taken by the controller 214. However, if the estimated range r is greater than the predetermined range, the controller 214 constructs a scanning control command which is properly inserted into the TX data 216 via multiplexer 217 for transmission to the communication unit 104, block 403. The scanning control command is later used to interrupt the normal operation of the communication unit to commence scanning of adjacent cell sites and to find an appropriate cell site to hand off to. Accordingly, the scanning control command constitutes an interrupt signal. After transmitting the scanning control command, the repeater controller 214 pause to allow time for communication unit 104 to execute the scanning operation. In block 404, the pause time is calculated is calculated. After this pause the, the range will be rechecked, block 401. This process continues until the communication unit executes a hand off to another repeater (or the call is completed). It may be appreciated that the repeater 102 may be configured to vary the pause interval in response to the measured range of the communication unit as shown in block 404.

Accordingly, the interrupt signal is periodically retransmitted as a function of the measured range.

Figure 5:
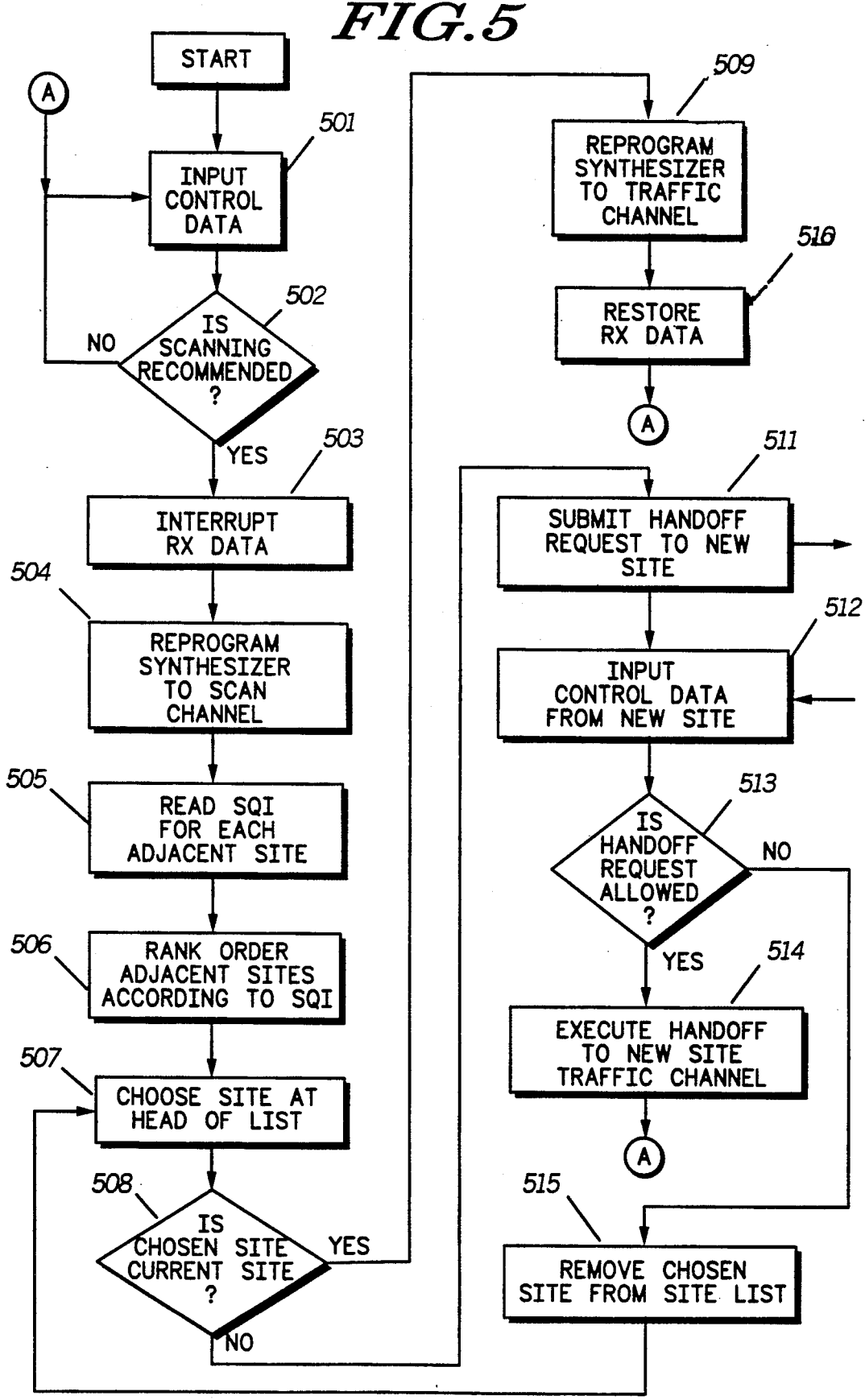
FIG. 5 is the flow chart of the operational steps of the communication unit of FIG. 3.

Referring to FIG. 5, the flow chart of the steps taken by the controller 309 of the communication device 104 is shown, the controller 309 receives the control data 307 retrieved from the RX signal 303, block 501. A determination is made as to whether the control data 307 includes the scanning control command, block 502. If the scanning control command is detected the interrupt signal 327 is generated which interrupts the application of the RX data 308 to the vo-coder 312, block 503. The frequency data 321 is generated to re-program the synthesizer 322 to scan the frequency channels of the adjacent cell sites C1-C3, block 504. Preferably, scanning of the adjacent cell sites C1-C3 is performed during the time slots which are not assigned to the communication unit 104. In this way, there would be no interruption in the normal operation of the communication unit during the scanning of the adjacent cell sites C1-C3. The received signal quality of all the adjacent cell sites C1-C3 are indicated via the signal quality indicator signal 310, block 505. The adjacent cell sites C1-C3 are listed in a ranked order based on the received signal quality, wherein the cell site providing the best or highest signal quality is ranked at the top of the list, block 506. A determination is made as to whether the highest ranked cell site comprise currently registered cell site, block 508. If the currently registered cell site is the highest ranked cell site, the synthesizer 322 is reprogrammed to the traffic channel of the current repeater 102 and coupling of the RX data to the vo-coder 312 is resorted, block 509 and 510. This allows selection of currently registered cell site if it provides higher signal quality than other adjacent cell sites, even though the communication unit 104 is out of the predetermined range R. However, if an adjacent cell site is highest ranked, a hand off request signal is inserted in the TX data 315 to be transmitted to that cell site, block 512. Then, the control data received from the adjacent cell site is inputted and decoded, block 512, and determination is made as to whether the hand off request is granted by that cell site, block 513. If the hand off request is granted, the hand off to the adjacent cell site is executed, block 514. If the hand off request is not granted the selected adjacent cell site is removed from the ranked order list, block 515, and the subsequent cell site in the list is selected. If none of the adjacent cell sites accept the hand off request the currently registered cell site is selected.

Accordingly, in the TDM communication system 100, the hand off from one cell site to another cell site is facilitated by considering the range of the communication unit from the repeater. In the communication system 100, the communication units 104 are only handed off when positioned outside of a predetermined range and when the adjacent cell sites provide a higher received signal quality than the presently registered cell site. This arrangement allows interruption in the normal operation only when the communication unit is out side of a predetermined quality communication range as opposed to periodic and/or random interruption of the prior art. Additionally, the decision to hand off is made by each communication unit individually which greatly reduces the infrastructure complexity of in the TDM communication system 100.

What is claimed is:

1. In a cellular communication system being divided into a plurality of cell sites, wherein each cell site includes a transceiver unit for providing communication to at least one communication unit, a method for handing off the communication unit from one cell site to another cell site comprising the steps of:

in the transceiver unit:
- a. determining the range of the communication unit from transceiver unit;
- b. transmitting an interrupt signal to the communication unit if the range exceeds a predetermined range;

in the communication unit:
- c. measuring received signal quality of the adjacent cell sites in response to reception of said interrupt signal; and
- d. selecting an available cell site which provides the highest signal quality to the communication unit.

2. The hand off method for cellular systems of claim 1, wherein said cellular system comprises a time division multiplexed communication system.

3. The hand off method for cellular systems of claim 1, wherein step a) includes:
- a(1) measuring propagation delay of a received signal from said communication unit.

4. The hand off method for cellular system of claim 1, wherein said predetermined range for quality communications is substantially one half the cell site radius.

5. The hand off method for cellular system of claim 1, wherein said interrupt signal is periodically retransmitted as a function of the range.

6. In a cellular communication system being divided into a plurality of cell sites, wherein each cell site includes a transceiver unit for providing communication to at least one communication unit, a method for handing off the communication unit from one cell site to another cell site comprising the steps of:

in the transceiver unit:
- a. determining the range of the communication unit from transceiver unit by measuring propagation delay of a received signal from said communication unit;
- b. transmitting an interrupt signal to the communication unit if the propagation delay exceeds a predetermined period;

in the communication unit:
- c. measuring received signal quality of the adjacent cell sites in response to reception of said interrupt signal; and
- d. selecting an available cell site which provides the highest signal quality to the communication unit.

* * * * *